United States Patent [19]

Elings et al.

[11] Patent Number: 5,306,919

[45] Date of Patent: Apr. 26, 1994

[54] POSITIONING DEVICE FOR SCANNING PROBE MICROSCOPES

[75] Inventors: Virgil B. Elings; John A. Gurley, both of Santa Barbara, Calif.

[73] Assignee: Digital Instruments, Inc., Santa Barbara, Calif.

[21] Appl. No.: 947,831

[22] Filed: Sep. 21, 1992

[51] Int. Cl.[5] .............................................. H01J 37/20
[52] U.S. Cl. ................................ 250/442.11; 310/328
[58] Field of Search ............................ 250/306, 442.11; 310/328

[56] References Cited

U.S. PATENT DOCUMENTS

| | | | |
|---|---|---|---|
| 3,899,728 | 8/1975 | Hoppe | 310/328 |
| 4,520,570 | 6/1985 | Bednorz et al. | 33/613 |
| 4,871,938 | 10/1989 | Elings et al. | 310/330 |
| 5,198,715 | 3/1993 | Elings et al. | 310/328 |

Primary Examiner—Bruce C. Anderson
Attorney, Agent, or Firm—Charles H. Schwartz; Ellsworth R. Roston

[57] ABSTRACT

A two dimensional piezoelectric positioning device of the type including a thin walled cylindrical shaped member of piezoelectric material. A plurality of substantially rectangular shaped members are positioned around one surface of the cylindrical shaped member to form opposite pairs of electrodes to control the two dimensional movement in accordance with voltages applied to the pairs of electrodes. Each rectangular shaped member is split into at least two electrode portions and with particular polarity voltages applied to the individual electrode portions to maintain a substantially constant length for the cylindrical shaped member during the two dimensional movement.

28 Claims, 2 Drawing Sheets

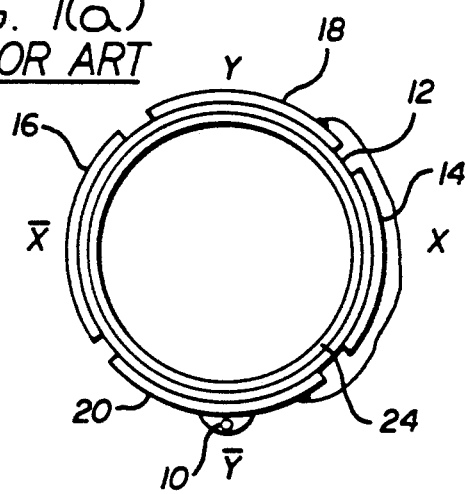
FIG. 1(a) PRIOR ART
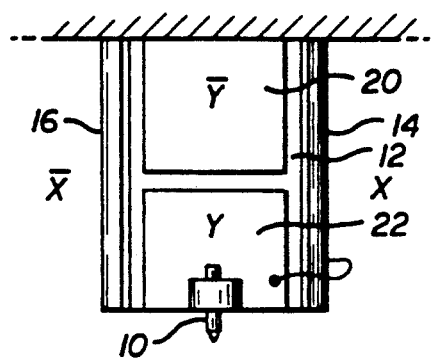
FIG. 1(b) PRIOR ART
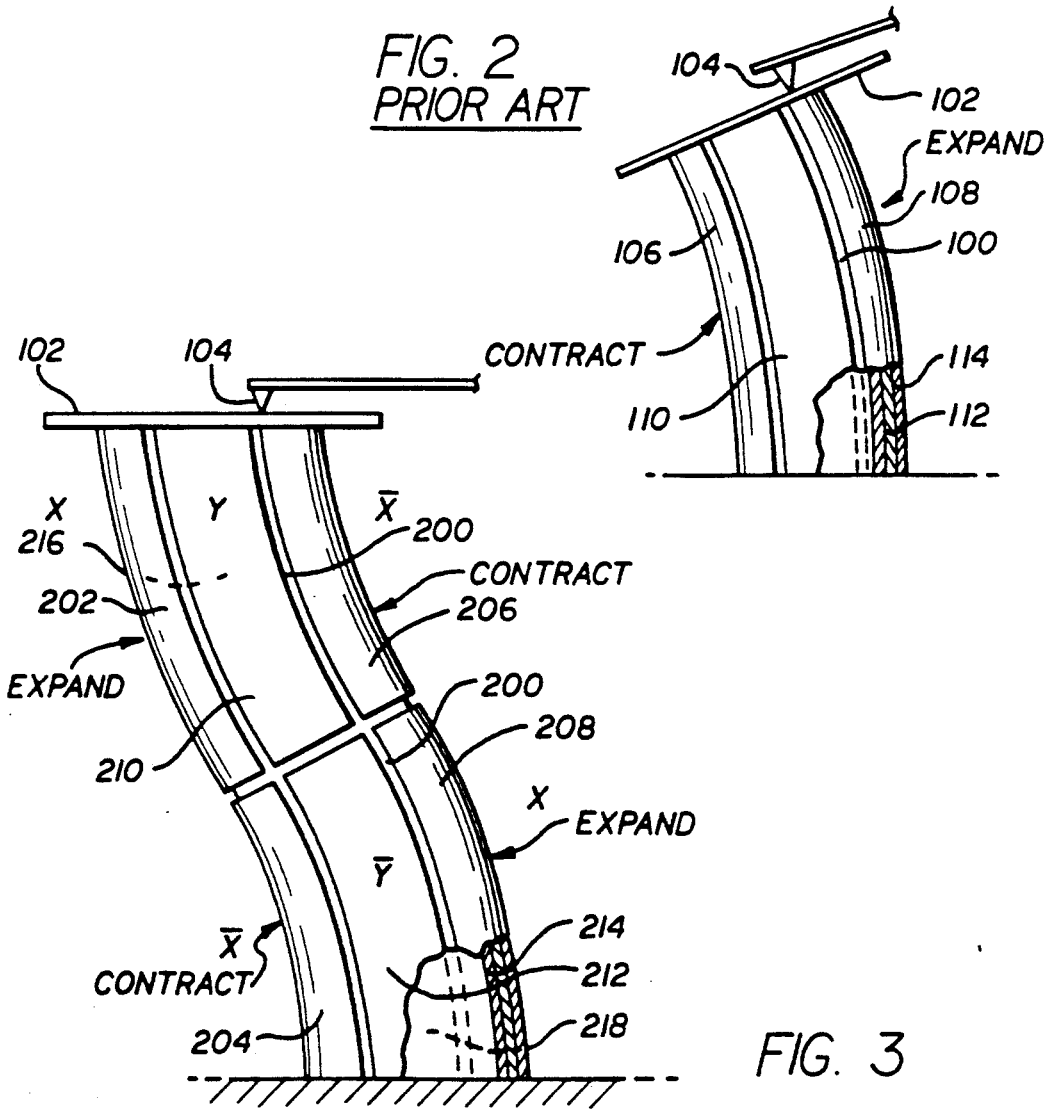
FIG. 2 PRIOR ART
FIG. 3

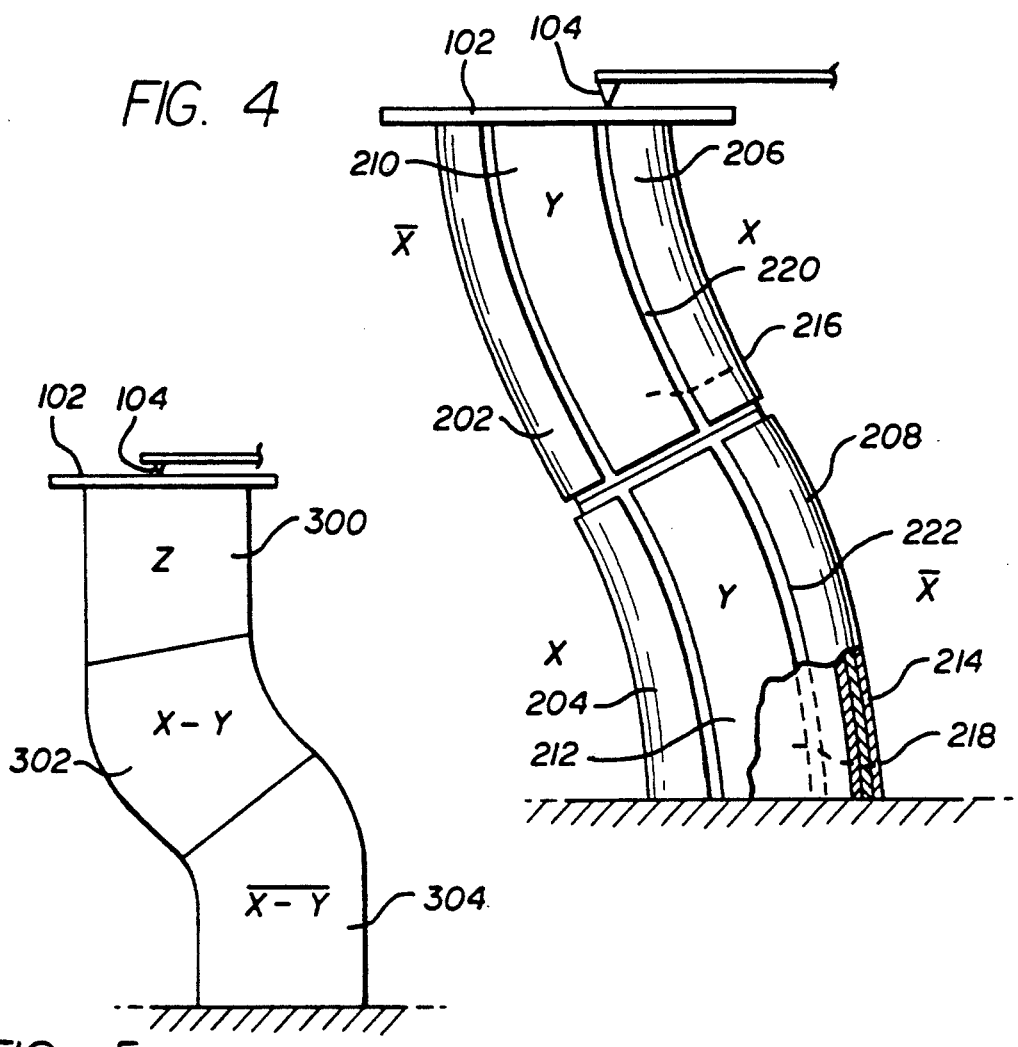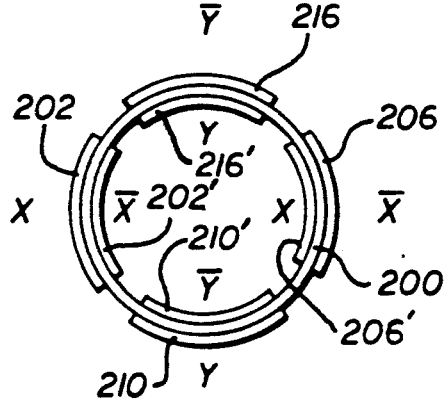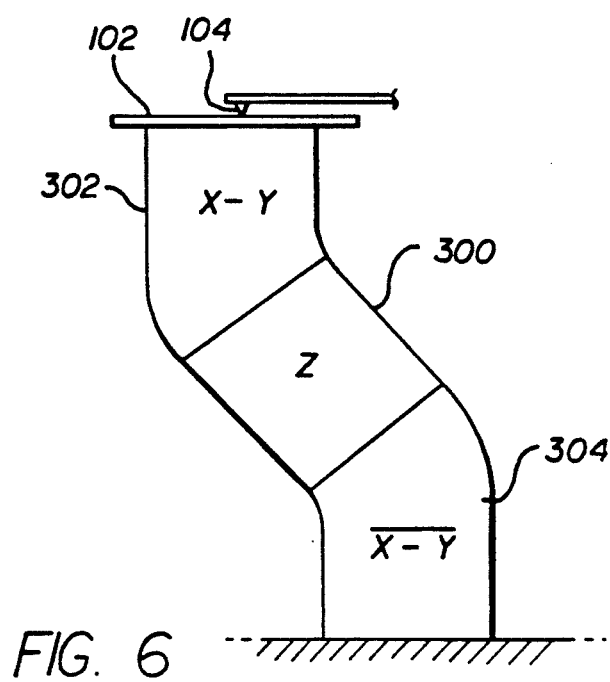

POSITIONING DEVICE FOR SCANNING PROBE MICROSCOPES

BACKGROUND OF THE INVENTION

1. Field of the Invention

The present invention relates to an improved design of a piezoelectric positioning device for scanning probe microscopes to control the relative position of the surface of a sample under observation to a tip member. Specifically, the present invention relates to an improved electrode arrangement for a piezoelectric device to eliminate tilting of the device during scanning.

2. Description of the Prior Art

In general, a scanning probe microscope operates by positioning a conducting tip or needle either just touching or very close to the surface of a conducting sample. In particular, if the scanning probe microscope is a scanning tunneling microscope, the relative position between the tip and the surface is approximately ten angstroms (10 Å) above the surface of the sample and as described in the prior art, a tunneling current flowing between the sample and the tip is used to detect the profile of the surface. If the scanning probe microscope is an atomic force microscope then the tip just touches the surface of the sample and detection of the position of the tip is produced as provided in the prior art.

In general, scanning probe microscopes include positioning apparatus so as to control the relative scan between the tip and the surface of the sample in an X-Y raster scan while keeping the tip just in contact with the surface of the sample or a substantially constant height above the surface. In both types of scanning probe microscopes it is possible to, either keep the tip stationary and move the sample with the positioning device in order to perform the scan, or to keep the sample stationary and move the tip with the positioning device in order to perform the scan. In general, although this is not necessary, a scanning tunneling microscope normally has the sample stationary with the tip movable whereas an atomic force microscope normally has the tip stationary and the sample movable relative to the tip.

Our prior art U.S. Pat. No. 4,871,938 issued on Oct. 3, 1989 was directed to a specific problem relating to the nonperpendicular nature of the X-Y scan for positioning devices prior to the '938 patent and also for minimizing horizontal-vertical cross-coupling and in particular for minimizing the vertical-horizontal cross-coupling at the side of the tube where the tip was mounted.

In our prior art design, and in particular the embodiment which used a cylindrical positioning device, a "pentrode" design was used which kept the side of the tube on which the tip was mounted from moving up and down as the tube was scanned side to side. Although this design was excellent for a tip that is mounted at one point on the scanner, the design does not work well when the sample is mounted on the end of the positioning device. In our previous design the tube tilts as the sample is scanned in the X and Y directions. As indicated above, mounting the sample on the end of the positioning device is the preferred form for an atomic force microscope, but is to be appreciated that a scanning tunneling microscope may also be operated in the same way.

SUMMARY OF THE PRESENT INVENTION

All of the prior art devices including applicants' previous design shown in U.S. Pat. No. 4,871,938 produce a tilting of the end of the cylindrical member. In the present invention, the tilting is substantially eliminated by splitting all four X-Y horizontal scan electrodes into two electrode portions and with each electrode portion driven at the opposite polarity of the other electrode portion or at least in the opposite direction of voltage change.

Although a split electrode was shown in our prior patent, this split electrode was only used to compensate for a movement up and down on one side of the cylindrical tube as the tube was scanned side to side. However, our prior patent would still provide for a tilting of the tube during scanning.

In the present invention, a split electrode is provided to all four X-Y electrodes and expanding and contracting occurs on each side of the tube in essentially equal amounts so as to provide for a substantially constant length for the tube during X-Y scanning. The split electrode of the present invention causes the tube to bend in an S shape for any given scan point whereby the length of all sides of the tube remains the same or changes by the same amount dependent upon changes that are specifically produced in the Z direction by a separate unitary electrode.

The bending of the tube in the S shape provides for the lateral or X-Y translation of the end of the tube so that a sample member can be mounted at the end of the tube and can be scanned in the X-Y direction by a stationary probe without the undesired tilting. It is to be appreciated that if the tube tilted during X-Y scanning this would have the same effect as moving the sample up and down and with the degree of movement increased the further the probe is from the center of the tube. This would certainly be an undesirable effect if it is desired to use large samples and to move the sample relative to the probe over large areas of the sample. The one disadvantage of the present invention is that some of the translation range in the X-Y direction is sacrificed in order to provide for the elimination of the tilting.

The present invention may provide for the four-sided split electrode design using a number of different embodiments. For example, the tube member could have the unitary Z electrode located on the inner surface of the cylindrical member as is shown in the prior '938 patent. Alternately, all of the electrodes including the Z electrode could be located on the same side of the cylindrical member but with all of the four X-Y electrodes being split. The Z electrode may be located at one end of the cylindrical member or could be located between the split electrodes. In addition, the Z electrode could be located on the exterior of the cylindrical member and with the split X-Y electrodes located on the interior surface.

BRIEF DESCRIPTION OF THE DRAWINGS

A clearer understanding of the present invention will be had with reference to the following description and drawings wherein;

FIGS. 1(a) and 1(b) illustrate a prior art piezoelectric three-dimensional positioning device in accordance with our prior U.S. Pat. No. 4,871,938;

FIG. 2 illustrates a more generalized prior art piezoelectric three-dimensional positioning device and illustrating the problems with such a device;

FIG. 3 is a side view of a three-dimensional scanner of the present invention showing the splitting of the X-Y electrodes into two electrode portions;

FIG. 4 is a second embodiment of a three-dimensional scanner of the present invention wherein the cylindrical tube is composed of two separate pieces which are oppositely polarized;

FIG. 5 is a third embodiment of the scanner of the present invention illustrating all three orthogonal groups of electrodes being located on the same surface of the cylindrical member;

FIG. 6 is a fourth embodiment of the scanner of the present invention, similar to that shown in FIG. 5, but with the unitary Z electrode being located intermediate the split X-Y electrodes; and FIG. 7 illustrates a modification of the invention where there are X-Y electrodes on both the inside and outside of the cylindrical members.

DESCRIPTION OF THE PREFERRED EMBODIMENTS

A prior art cylindrical positioning member including a single split electrode is shown in FIGS. 1(a) and 1(b). This prior art structure is described as part of our prior U.S. Pat. No. 4,871,938 and includes a tip 12 shown mounted on the outside surface of a piezoelectric cylindrical element 12. The cylindrical element 12 also includes on the outside surface of the cylinder, a plurality of outside electrodes including a pair of X electrodes 14 and 16, and a pair of Y electrodes including a single Y electrode 18, and a split Y electrode formed of electrode portions 20 and 22. In addition, a Z electrode 24 is provided on the inside surface of the cylinder 12.

The tip 10 is mounted on the bottom of the Y electrode portion 22 and is shown in FIGS. 1(a) and 1(b). Applied to the upper Y electrode portion 20 is a voltage of one plurality while applied to the electrode 18 in combination with the electrode portion 22 is a voltage of an opposite plurality. As can be seen, the prior art structure of FIGS. 1(a) and 1(b) provides a split electrode on the side where the tip is mounted and with the split electrode formed by at least two electrode portions and with these two electrode portions being driven with complementary voltages of opposite polarity.

Any vertical motion for the tip 10, as the tip 10 is scanned in the Y direction is essentially eliminated for the prior art structure shown in FIGS. 1(a) and 1(b), if the two electrode portions 20 and 22 are driven by opposite and complementary voltages. This is because the vertical expansion or contraction provided by the upper electrode portion 20 is canceled by the opposite contraction or expansion of the lower electrode portion 22. This elimination of the vertical motion is, however, only accomplished on the side of the tube where the split electrode is located and where the tip is mounted.

As indicated above, this prior art structure works for a tip mounted at one point on the scanner, but for many types of scanning probe microscopes and specifically, but not limited to, atomic force microscopes, the sample would normally be mounted at an end and preferably on top of the cylindrical scanner. For prior art devices including that shown in FIGS. 1(a) and 1(b), the top of the cylindrical scanner would tilt as the tube is scanned in the X-Y directions.

FIG. 2 illustrates in generalized form, prior art devices illustrating this tilting. As shown in FIG. 2, a cylindrical member 100 has mounted at one end a sample 102 which is to be scanned by a probe including a tip 104. The tip may either be part of a tip used in an atomic force microscope or may be a tip used in a scanning tunneling microscope, but in any event, as shown in FIG. 2, the sample 102 would be tilted as the piezoelectric cylindrical member 10 is used to provide scanning in either the X-Y direction.

The cylindrical member 100 would include pairs of electrodes 106 and 108 which would be used to scan the sample in one direction and with pairs of electrodes 110 and 112 used to scan the sample 102 in a second perpendicular direction. In addition, the interior surface of the cylindrical member 100 may include an electrode 114 to move the sample in an up and down or Z direction. It is to be appreciated that the pairs of electrodes 106 and 108 may be X directional electrodes and electrodes 110 and 112 may be Y directional electrodes or this may be reversed.

It does not matter whether any one of the electrodes 106 through 112 are split or not since the only effect of the splitting would be to minimize but not eliminate the tilting along one side. This is because the tube will bend as the polarity of the voltage applied to one electrode expands the piezoelectric material on one side of the tube whereas the opposite polarity voltage applied to the electrode on the other side of the tube contracts the material. This is clearly shown in FIG. 2.

If one of the electrodes 106–112 is split, the one side with the split electrode would remain relatively constant in length, but the electrode on the other side of the tube would still expand or contract depending upon the polarity of the voltage and this would produce tilting.

The present invention is directed to a structure to prevent all sides of the tube from moving up and down by splitting all of the four X and Y scan electrodes into split electrodes or electrode portions and with one portion of each split electrode driven at the opposite polarity of the other portion or at least in the opposite direction of voltage change. By providing the split electrode design to all four electrodes then both expanding and contracting occurs on each side of the tube in essentially equal amounts so that the length of the tube remains essentially constant apart from movement in the Z direction by a Z electrode. The tube is essentially bent in an S-shape for any given scanning point but where the total length of all sides of the tube remain the same or change the same amount. This characteristic S-shape may be seen with reference to FIGS. 3 through 6 which illustrate four different embodiments of the invention.

In FIG. 3 the sample 102 is shown mounted on the top of a tube 200 and with the tip 104 shown adjacent the sample 102. As indicated above, the scanning structure may be part of a scanning probe microscope such as an atomic force microscope or a scanning tunneling microscope. It is also to be appreciated that although the tip is shown stationary and the sample movable, the opposite structure may be provided thereby the tip 104 is mounted at the end of the cylindrical member 200 and the sample 102 is stationary and located adjacent to the tip.

In FIG. 3 the cylindrical member 200 includes a plurality of split electrodes or electrode portions located around the outside circumference of the piezoelectric cylindrical member 200. Specifically, X electrode portions 202 through 208 form a complementary pair of electrodes including a first X electrode provided by portions 202 and 204 and a second X electrode provided by portions 206 and 208 and with the first and second electrodes on opposite sides of the tube 200.

Similarly, Y electrodes may be formed in a complementary pair with a first Y electrode formed by portions 210 and 212 shown on one side of the tube 200 with a second Y electrode formed by electrode portions 216 and 218 on the opposite side of the portions 210 and 212. The interior of the cylindrical member 200 may have a Z electrode 214. The electrode portions 216 and 218 are shown by dotted lines and the Z electrode 214 is shown in the break away portion of FIG. 3.

As can be seen in FIG. 3 one half of each split electrode or each electrode portion is driven at the opposite polarity to the other half or electrode portion or at least in the opposite direction of voltage change. This is designated by either X or $\overline{X}$ or Y or $\overline{Y}$. FIG. 3 also illustrates in exaggerated form how the tube is bent in an S-shape at any given scan point so that the total length of all sides to the tube 200 remains the same or changes by the same amount if voltage applied to the Z electrode 214. The application of the opposite complementary polarity voltages as described above compensates to maintain the length of the tube at a constant.

In addition, the application of voltages to the scan electrodes provides for lateral translation of the end of the tube in the X-Y directions dependent upon the magnitude of the voltages. The present invention therefore provides for the lateral translation in the X and Y directions of the piezoelectric cylindrical member and thereby provides for the relative motion between the sample member 102 and the tip member 104 while at the same time substantially eliminating tilting of the end of the cylindrical member. This eliminates the undesirable affect that the tilt would cause in attempting to use the scanner as part of a scanning probe microscope.

FIG. 4 illustrates a second embodiment of the invention similar to the first embodiment and with similar reference numerals used for elements similar to that shown in FIG. 3. The one major difference between the embodiment of FIG. 4 and the embodiment of FIG. 3 is that the single cylindrical piezoelectric tubular member 200 of FIG. 3 is replaced by two separate cylindrical members 220 and 222 mounted end to end.

If the two separate piezoelectric cylindrical members 220 and 222 are polarized in the same direction, then the operation of the embodiment of FIG. 4 would be essentially the same as FIG. 3. However, since the embodiment of FIG. 4 is constructed by two separate cylindrical members, it is therefore possible to have the two cylindrical members oppositely polarized. With such a structure, as shown in FIG. 4, the polarity of the voltages supplied to the electrode portions on the same side of the tube can be identical.

This is shown in FIG. 4 wherein the first electrode formed by the X electrode portions 202 and 204 have the same polarity designation X and similarly the second opposite electrode formed by the electrode portions 206 and 208 have the same polarity designation $\overline{X}$. The same would be true for the Y and $\overline{Y}$ electrodes. Since the individual piezoelectric cylindrical members 220 and 222 are oppositely polarized, the piezoelectric effects would be opposite and the ultimate result would be to produce the same S-shape bending of the tube member for any given scanning point as shown in FIG. 4.

FIGS. 5 and 6 illustrate third and fourth embodiments of the invention wherein the Z electrode is applied to a separate cylindrical member than the X and Y electrodes. This could be either on the inside or the outside of the cylindrical member or complementary signals on the inside and outside. In FIG. 5, a Z electrode 300 is shown to be at one end of the cylindrical member and with the complementary pairs of split X-Y electrodes 302 and 304 adjacent to each other and having essentially the same structure as shown in either of the embodiments of FIG. 3 or FIG. 4. It can be seen therefore that the X-Y electrodes 302 and 304 assume the S-shape for any given scan point and the Z electrode provides for the movement in the orthogonal Z direction.

FIG. 6 is a variation of the embodiment of FIG. 5 and has the Z electrode portion 300 located intermediate the split X-Y electrodes 302 and 304. Again, the X-Y electrode 302 and 304 would be similar in construction to that shown in either FIGS. 3 or 4. The embodiment shown in FIG. 6 provides for somewhat more scan range in the X-Y directions because the Z electrode, by being located intermediate the split X-Y electrodes 302 and 304, would tend to magnify the S-shape and thereby increase the scanning range.

It is to be appreciated that the X-Y electrodes 302 and 304 shown in FIGS. 5 and 6 are representative of the total X-Y electrode structure shown in FIGS. 3 and 4 so that X-Y section 302 is actually representative of all four separate electrode portions 202, 206, 210 and 216. Similarly, X-Y section 304 is representative of the electrode portions 204, 208, 212 and 218. It is also to be appreciated that the embodiments of FIGS. 5 and 6 could have the cylindrical member formed by separate members having opposite polarity so that, as shown in FIG. 4, the voltages on each side of the cylinder could have the same polarities. It is also to be appreciated that in FIGS. 5 and 6 that the X-Y electrodes could be on the inside of the tube, or could by both be on the inside and outside of the tube in order to increase the voltage applied across the piezoelectric material.

In addition, the sample member is shown mounted on the cylindrical member but the structure may be reversed to have the probe mounted on the cylindrical member relative to a stationary sample.

A modification of the invention is shown in FIG. 7 where X and Y electrodes are located on both the inside and outside of cylindrical member 200. This is shown by X electrode portions 202, 202', 206 and 206' and Y electrode portions 210, 210', 216 and 216'. There would be similar inside electrode portions for the electrode portions 204, 208, 212 and 216. The Z electrode would be positioned as shown in FIGS. 5 and 6. The use of the electrode portions on both the inside and outside of the cylindrical member provides for twice the electric field and twice the movement The present invention therefore provides for an improved scanning probe microscope including a split electrode design for all four X-Y electrodes so that both expanding and contracting occurs on all sides of the piezoelectric cylinder in essentially equal amounts to cause the tube to bend in an S-shape for any given scan point whereby the total length of all sides of the tube remain the same or are changed by the same amount.

Although the invention has been described with reference to a particular embodiment, it is to be appreciated that various adaptations and modifications may be made and the invention is only to be limited by the appended claims.

We claim:

1. A piezoelectric positioning device for controlling at least a two dimensional horizontal movement between a tip and a sample surface in a scanning probe microscope, including, a thin walled cylindrical shaped member formed of piezoelectric material having inner and outer surfaces and having a first fixed end and a second opposite movable end, a tip member and a sample member having a sample surface and with the tip member and sample member positioned relative to each other to have the tip member located adjacent to the sample surface and with one of the tip member and sample member mounted on the movable end of the cylindrical shaped member, a plurality of substantially rectangular shaped members positioned around one of the surfaces of the cylindrical shaped member to form opposite pairs of electrodes to control the two dimensional horizontal movement between the tip member and sample surface in accordance with voltages applied to the pairs of electrodes, wherein each rectangular shaped member is split into at least two electrode portions and with particular polarity voltages applied to the individual electrode portions to substantially eliminate tilting of the movable end of the cylindrical shaped member during the two dimensional movements, and wherein the cylindrical shaped member is formed of at least two pieces of piezoelectric material polarized in opposite directions and with the individual electrode portions in each split electrode located on a different one of the pieces of piezoelectric material and with the same polarity voltage applied to the individual electrode portions in each split electrode.

2. The piezoelectric positioning device of claim 1 wherein the sample member is mounted on the movable end of the cylindrical shaped member.

3. The piezoelectric positioning device of claim 1 additionally including a unitary member positioned around the other surface of the cylindrical shaped member to form a unitary electrode to control a vertical movement between the tip member and sample surface in accordance with voltage applied to the unitary electrode.

4. The piezoelectric positioning device of claim 1 additionally including complementary electrode portions on the other surface of the cylindrical shaped member to receive particular polarity voltages to substantially increase the two dimensional movement.

5. The piezoelectric positioning device of claim 1 additionally including a unitary member positioned around the one surface of the cylindrical shaped member to form a unitary electrode to control a vertical movement between the tip member and sample surface in accordance with voltage applied to the unitary electrode.

6. The piezoelectric positioning device of claim 5 wherein the unitary electrode is located at one end of the cylindrical shaped member.

7. The piezoelectric positioning device of claim 5 wherein the unitary electrode is located in the middle of the cylindrical shaped member between the individual portions of each split electrode.

8. The piezoelectric position device of claim 1 wherein each of the rectangular shaped members is of substantially the same length.

9. In an at least two dimensional piezoelectric positioning device of the type including a thin walled cylindrical shaped member of piezoelectric material having a plurality of substantially rectangular shaped members positioned around one surface of the cylindrical shaped member to form opposite pairs of electrodes to control the two dimensional movement in accordance with voltages applied to the pairs of electrodes, an improvement including each rectangular shaped member split into at least two electrode portions and with particular polarity voltages applied to the individual electrode portions to maintain a substantially constant length for the cylindrical shaped member during the two dimensional movement, and wherein the cylindrical shaped member is formed of at least two pieces of piezoelectric material polarized in opposite directions and with the individual electrode portions in each split electrode located on a different one of the pieces of piezoelectric material and with the same polarity voltage applied to the individual electrode portions in each split electrode.

10. The piezoelectric positioning device of claim 9 wherein the cylindrical shaped member is formed of a single piece of piezoelectric material polarized in a particular direction and with opposite polarity voltages applied to the individual electrode portions in each split electrode.

11. The piezoelectrode positioning device of claim 9 wherein the cylindrical shaped member is formed of at least two pieces of piezoelectric material polarized in opposite directions and with the individual electrode portions in each split electrode located on a different one of the pieces of piezoelectric material and with the same polarity voltage applied to the individual electrode positioning in each split electrode.

12. The piezoelectric positioning device of claim 9 wherein a sample member is mounted on the end of the cylindrical shaped member.

13. The piezoelectric positioning device of claim 9 additionally including complementary electrode portions on the other surface of the cylindrical shaped member to receive particular polarity voltages to substantially increase the two dimensional movement.

14. The piezoelectric positioning device of claim 9 additionally including a unitary member positioned around another surface of the cylindrical shaped member to form a unitary electrode to control a vertical movement of the sample member in accordance with voltage applied to the unitary electrode.

15. The piezoelectric positioning device of claim 9 additionally including a unitary member positioned around both surfaces of the cylindrical shaped member to form a unitary electrode to control a vertical movement of the sample member in accordance with voltage applied to the unitary electrode.

16. The piezoelectrode positioning device of claim 15 where in the unitary electrode is located at one end of the cylindrical shaped member.

17. The piezoelectric positioning device of claim 15 wherein the unitary electrode is located in the middle of the cylindrical shaped member between the individual portions of each split electrode.

18. The piezoelectric position device of claim 9 wherein each of the rectangular shaped members is of substantially the same length.

19. A piezoelectric positioning device for controlling at least a two dimensional horizontal movement between a tip and a sample surface in a scanning probe microscope, including, a thin walled cylindrical shaped member formed of piezoelectric material having inner and outer surfaces and having a first fixed end and a second opposite movable end, a tip member and a sample member having a sample surface and with the tip member and sample member positioned relative to each other to ave the tip member located adjacent to the sample surface and with one of the tip member and sample member mounted on the movable end of the cylindrical shaped member, a plurality of substantially rectangular shaped members positioned around one of the surfaces of the cylindrical shaped member to form opposite pairs of electrodes to control the two dimensional horizontal movement between the tip member and sample surface in accordance with voltages applied to the pairs of electrodes, wherein each rectangular shaped member is split into at least two electrode portions and with particular polarity voltages applied to the individual electrode portions to substantially eliminate tilting of the movable end of the cylindrical shaped member during the two dimensional movements, a unitary member positioned around the one surface of the cylindrical shaped member to form a unitary electrode to control a vertical movement between the tip member and sample surface in accordance with voltage applied to the unitary electrode, and wherein the unitary electrode is located in the middle of the cylindrical shaped member between the individual portions of each split electrode.

20. The piezoelectric positioning device of claim 19 wherein the cylindrical shaped member is formed of a single piece of piezoelectric material polarized in a particular direction and with opposite polarity voltages applied to the individual electrode portions in each split electrode.

21. The piezoelectric positioning device of claim 19 wherein the sample member is mounted on the movable end of the cylindrical shaped member.

22. The piezoelectric positioning device of claim 19 additionally including complementary electrode portions on the other surface of the cylindrical shaped member to receive particular polarity voltages to substantially increase the dimensional movement.

23. The piezoelectric position device of claim 19 wherein each of the rectangular shaped members is of substantially the same length.

24. In an at least two dimensional piezoelectric positioning device of the type including a thin walled cylindrical shaped member of piezoelectric material having a plurality of substantially rectangular shaped members positioned around one surface of the cylindrical shaped member to form opposite pairs of electrodes to control the two dimensional movement in accordance with voltages applied to the pairs of electrodes, an improvement including each rectangular shaped member split into at least two electrode portions and with particular polarity voltages applied to the individual electrode portions to maintain a substantially constant length for the cylindrical shaped member during the two dimensional movement, a unitary member positioned around both surfaces of the cylindrical shaped member to form a unitary electrode to control a vertical movement of the sample member in accordance with voltage applied to the unitary electrode, and wherein the unitary electrode is located in the middle of the cylindrical shaped member between the individual portions of each split electrode.

25. The piezoelectric positioning device of claim 24 wherein the cylindrical shaped member is formed of a single piece of piezoelectric material polarized in a particular direction and with opposite polarity voltages applied to the individual electrode portions in each split electrode.

26. The piezoelectric positioning device of claim 24 wherein a sample member is mounted on the end of the cylindrical shaped member.

27. The piezoelectric positioning device of claim 24 additionally including complementary electrode portions on the other surface of the cylindrical shaped member to receive particular polarity voltages to substantially increase the two dimensional movement.

28. The piezoelectric position device of claim 24 wherein each of the rectangular shaped members is of substantially the same length.

* * * * *